United States Patent [19]

Inoue et al.

[11] 3,953,383

[45] Apr. 27, 1976

[54] CATALYTIC PROCESS FOR COPOLYMERIZING EPOXY COMPOUNDS WITH CARBON DIOXIDE

[75] Inventors: Shohei Inoue, Tokyo; Masaki Kanbe, Fujisawa; Tadamichi Takada, Yokohama; Nobuyuki Miyazaki; Masanori Yokokawa, both of Fujisawa, all of Japan

[73] Assignee: Nippon Oil Seal Industry Co., Ltd., Tokyo, Japan

[22] Filed: Nov. 12, 1974

[21] Appl. No.: 523,160

Related U.S. Application Data

[62] Division of Ser. No. 380,222, July 18, 1973, Pat. No. 3,900,424.

[30] Foreign Application Priority Data

July 21, 1972 Japan.............................. 47-73616
July 24, 1972 Japan.............................. 47-73443

[52] U.S. Cl. ........................ 260/2 BP; 260/77.5 D
[51] Int. Cl.² ........................................ C08G 63/62
[58] Field of Search ..................... 260/2 BP, 77.5 D

[56] References Cited
UNITED STATES PATENTS 3,585,168  6/1971  Inoue et al..................... 260/77.5 D
3,706,713  12/1972  Hull .............................. 260/77.5 D

OTHER PUBLICATIONS

Kobayashi et al., Jour. Polymer Science, Vol. 11, (1973), pp. 2383-2385, (and the reference cited therein).

Inoue et al., Die Makromolecular Chemie, 130, (1969), pp. 210-220, (No. 3170).

Kobayashi et al., Copolymerization of $CO_2$ and Epoxide etc., Die Makromolekular Chemie, 169, (1973), pp. 69-81.

*Primary Examiner*—H. S. Cockeram
*Attorney, Agent, or Firm*—Holman & Stern

[57] ABSTRACT

A catalyst composition and a process for preparing same comprising the reaction product of (a) an organo-metallic compound having the general formula R'nM, wherein $n$ is an integer, at least one R' is an alkyl group, an alicyclic group, or halogen, hydroxy or alkoxy derivatives thereof, or hydrogen, the remaining R' groups are alkyl groups, alicyclic groups, alkaryl groups, aralkyl groups, aryl groups, or halogen, hydroxy or alkoxy derivatives thereof, and M is a metal of Group II or Group III of the periodic Table; (b) a co-catalyst component which is sulfur or a compound containing active hydrogen atoms, and (c) carbon dioxide. The catalyst composition is used in preparing copolymers of epoxy compounds with carbon dioxide.

7 Claims, No Drawings

CATALYTIC PROCESS FOR COPOLYMERIZING EPOXY COMPOUNDS WITH CARBON DIOXIDE

This is a divisional, of application Ser. No. 380,222, filed July 18, 1973, now U.S. Pat. No. 3,900,424.

The present invention relates to the copolymerization of epoxy compounds with carbon dioxide, and more particularly, to an improved catalyst and a process for preparing same for use in copolymerizing epoxy compounds with carbon dioxide.

U.S. Pat. No. 3,585,168, in which one of the inventors of the present invention was a co-inventor, discloses a catalyst for copolymerizing epoxy compounds with carbon dioxide, which consists of organic compounds of metals of Group II or Group III of the Periodic Table and a co-catalyst having an active hydrogen atom, such as water, alcohol or ketone. This copolymerization catalyst can be prepared by reacting the organometallic compound component with the co-catalyst component in the presence of a solvent in a reaction vessel. However, it takes a long time to copolymerize epoxy compounds with carbon dioxide in the presence of the above mentioned catalyst, and the yield of the resulting copolymer is low. Further, the above mentioned catalyst has a disadvantage in that it does not have a high selectivity for producing a copolymer having an alternating structure and, accordingly, the content of alternating copolymer in the resulting products is low.

It is therefore an object of the present invention to provide a catalyst for copolymerizing epoxy compounds with carbon dioxide, which exhibits increased activity in such copolymerization reactions and which results in increased yields of copolymer product.

Another object of the invention is to provide a catalyst for copolymerizing epoxy compounds with carbon dioxide, which is highly selective in producing a copolymer having an alternating structure and which results in increased yields of alternating copolymer in the resulting product.

These and other objects have now herein been attained by providing a catalyst for copolymerizing epoxy compounds with carbon dioxide, which comprises a composite catalyst consisting of an organic compound of a metal of Group II or Group III of the Periodic Table and a co-catalyst component which is sulfur or a compound containing one or more active hydrogen atoms, treated with carbon dioxide.

The co-catalyst component is sulfur or a compound containing one or more active hydrogen atoms. Examplary co-catalysts include: water; salts containing water of crystallization selected from halides, nitrates, sulfates, pyrophosphates, phosphates, carbonates, borates, or acetates of metals, such as magnesium sulfate heptahydrate, magnesium nitrate hexahydrate, magnesium phosphate pentahydrate, basic magnesium carbonate pentahydrate, magnesium chloride hexahydrate, magnesium acetate tetrahydrate, zinc sulfate heptahydrate, zinc nitrate hexahydrate, aluminum sulfate octadecahydrate, aluminum nitrate nonahydrate, cadmium acetate dihydrate, calcium iodide hexahydrate, etc.; sulfur; inorganic acids such as hydrogen sulfide, hydrogen polysulfides, etc.; mono- or polyalcohols such as methanol, 1,4-butane diol, trimethylol propane, pentaerythritol, etc.; ketone compounds such as acetone, methyl ethyl ketone, acetylacetone, etc.; aldehyde compounds such as acetaldehyde, propyl aldehyde, etc.; organic acids such as oxalic acid, isophthalic acid, etc.; polyamines such as piperazine, ethylenediamine, hexamethylenediamine, etc.; primary mono-amines such as ethylamine, propyl amine, aniline, etc.; ammonia; hydrazines; esters or amides such as dimethyl malonate, acetamide, etc.; nitrile compounds such as acetonitrile, propionitrile, etc.; nitro compounds containing active hydrogen such as nitromethane, nitroethane, etc.; phenolic compounds such as resorcin, hydroquinone, aminophenol, novolac resins, etc. These compounds can be used independently or in combination.

The organometallic compounds used as a catalyst component may be compounds having the general formula $R'_nM$ wherein n is an integer and wherein at least one $R'$ is selected from the group consisting of an alkyl group, an alicyclic group and halogen, hydroxy and alkoxy derivatives thereof, and hydrogen, and the remaining $R'$ groups may be selected from the group consisting of alkyl groups, alicyclic groups, alkaryl groups, aralkyl groups, aryl groups and halogen, hydroxy and alkoxy derivatives thereof. M is a metal element selected from the group of metal elements in Groups II and III of the Periodic Table such as zinc, calcium, magnesium, cadmium, aluminum, etc. Examples of typical organometallic compounds used in the process of this invention include dialkylzinc, tetralkylzinccalcium, dialkylmagnesium, dialkylcadmium, trialkylaluminum, dialkylaluminum mono-halide, alkylaluminum sesquihalide, dialkylaluminum monohydride, etc. Among these compounds, organozinc compounds, organomagnesium compounds and organoaluminum compounds are especially preferable.

According to the present invention, the catalyst for copolymerizing epoxy compounds and carbon dioxide can be prepared from these organometallic compounds and co-catalyst components under the pressure of carbon dioxide gas. That is to say, organometallic compounds are brought into contact with sulfur or active hydrogen compounds in the atmosphere of an inert gas such as nitrogen, argon, helium, etc. or carbon dioxide. Gaseous, liquid or solid carbon dioxide, whose amount is equimolar to or more than the amount of organometallic compounds, is added to the inert gas atmosphere so that when gasified at room temperature, the carbon dioxide forms a system having generally a pressure of about 5 to 50 kg/cm². The resulting reaction system is treated under agitation at room temperature to 300°C for 0.1 to 100 hours, preferably at 50°C to 250°C for 0.2 to 60 hours and more preferably at 100°C to 200°C for 0.5 to 40 hours. The catalyst of the present invention can be also prepared by adding predetermined co-catalyst components to organometallic compounds preliminarily preserved in a system under the pressure of carbon dioxide at room temperature to about 150°C, and subjecting the resulting mixture to the same treatment as above. It is also possible to prepare the catalyst of the present invention by reacting organometallic compounds with co-catalyst components at room temperature to about 150°C for 150 hours or shorter period in the absence of carbon dioxide, and subjecting the resulting product to the same treatment as above in the presence of carbon dioxide.

The molar ratio of co-catalyst components to organometallic compounds is about 0.1 to 5.0, generally 0.3 to 2.0. The molar ratio of the composite catalyst may vary depending upon the selected organometallic compound, the selected co-catalyst or a combination thereof, the epoxide to be copolymerized and other conditions. The catalyst of the present invention can be prepared without using solvent, but, in general, it is preferable and safe to prepare the catalyst in solvents which are also used as polymerization reaction solvents.

Any inert organic solvent may be used as the solvent in the present invention, including aliphatic hydrocarbons, aromatic hydrocarbons, halogenated hydrocarbons, ethers, esters, carbonates, etc. Specific examples of suitable solvents are n-hexane, cyclohexane, benzene, toluene, ethylene dichloride, diethyl ether, ethyl isopropyl ether, tetrahydrofuran, dioxane, ethylene carbonate or mixtures thereof. The activity of the catalyst of the present invention depends upon the kind of solvent employed. It is preferable to prepare the catalyst in the presence of ethers such as dioxane, diethylether or tetrahydrofuran as the solvent to obtain the copolymer in good yield.

Epoxy compounds are copolymerized with carbon dioxide by the conventional method in the presence of the catalyst prepared according to the present invention. Examples of epoxy compounds which may be employed as a co-monomer are ethylene oxide, propylene oxide, 1-butene oxide, 2-butene oxide, isobutylene oxide, butadiene monoxide, butadiene dioxide, styrene oxide, cyclohexene oxide, cyclopentene oxide, 1,1-diphenyl ethylene oxide, stilbene oxide, glycidyl methacrylate, methyl glycidyl ether, phenyl glycidyl ether, vinyl cyclohexene oxide, epihalohydrin, dihydronaphthalene oxide, dodecene oxide and mixtures thereof.

In the copolymerization reaction, in general, a catalyst concentration (based on organometallic compounds) in the range of from about 0.001 and lower to about 20 mole percent based upon the epoxide monomer is suitable. A catalyst concentration in the range of from about 0.01 to about 10 mole percent is preferred. With the increase of the molar ratio of the catalyst, the rate of the copolymerization reaction also increases. However, it is not economically preferable to use an excessive amount of the catalyst.

Copolymerization between epoxy compounds and carbon dioxide is carried out as follows: Carbon dioxide gas is added to a reaction vessel containing catalyst or catalyst solution and epoxy compounds, and the resulting mixture is copolymerized at the reaction temperature of 0°C to 150°C, preferably at room temperature to about 70°C under normal or high pressure. The copolymerization reaction may be carried out in the presence of an inert liquid organic solvent. Suitable inert solvents for the copolymerization are, for example, hydrocarbons including aliphatic and cycloaliphatic hydrocarbons such as n-hexane, cyclohexane, n-heptane, petroleum ether, and the like, aromatic hydrocarbons such as benzene, toluene, and the like, oxygen containing solvents, particularly ethers, such as dioxane, tetrahydrofuran, diethyl ether, diisopropyl ether and the like, halogenated hydrocarbons such as methylene dichloride, chlorobenzene, and the like, and mixtures thereof.

After the completion of the copolymerization reaction, the reaction mixture is treated as follows: When ethylene oxide is used as the epoxy compound, the reaction mixture is placed in dilute hydrochloric acid to precipitate the resulting copolymer. When the precipitated product is washed with water and dried, a water-insoluble rubber-like elastic copolymer is obtained which is different from either a homopolymer of ethylene oxide or a copolymer whose principal component is ethylene oxide. To purify this copolymer, it is dissolved in solvents which can dissolve such copolymer such as chloroform, dichloromethane, etc., the resulting copolymer solution is washed with dilute hydrochloric acid and then water, and the washed solution is poured into acetone to precipitate a substantially alternating copolymer. Polyethylene carbonate, which is an alternating copolymer between ethylene oxide and carbon dioxide, is insoluble in acetone. Therefore, when polyethylene carbonate is precipitated in acetone, such alternating copolymer is separated from the other products present in the mixture including acetone-soluble polymers and lower molecular products. On the other hand, from the hydrochloric acid solution and the wash water used to precipitate the copolymer, water-soluble products can be recovered by extraction with chloroform followed by evaporation to dryness. When epoxy compounds other than ethylene oxide are used, the reaction mixture is dissolved in a solvent such as chloroform, dichloromethane, benzene, etc., and the resulting solution is washed with aqueous hydrochloric acid and then water. Thereafter, the solution is poured in methanol to isolate methanol-insoluble products from methanol-soluble products.

It is confirmed by the absorption bands of carbonate bond at 1,750 cm$^{-1}$ and 1,250 cm$^{-1}$ in infrared absorption spectrum that all the resulting products are copolymers. It was also confirmed by the elemental analysis that epoxy compounds were copolymerized with carbon dioxide. The content of in-chain carbonate groups within the resulting product is dependent upon the kinds of epoxide monomers and copolymerization conditions.

One effect of the catalyst according to the present invention is that it gives high activity to composition systems consisting of organometallic compounds and co-catalyst components which have no activity for copolymerization reactions between epoxy compounds and carbon dioxide, and further that it increases the activity of the conventional active catalyst system consisting of organometallic compounds and water, primary amine or resorcin, etc. A second effect of the catalyst of the present invention is that, compared with the conventional methods, the resulting copolymer, especially water- or methanol-insoluble copolymers, can be prepared in markedly higher yield, and alternating copolymers can be also obtained in markedly higher yield. These effects of the present invention will be apparent from comparison between the following examples and references.

As mentioned above, the catalyst of the present invention has higher activity than known catalysts prepared by the conventional method. The catalyst of the present invention also has excellent properties to enhance the yield of the resulting copolymer and has a good selectivity in the copolymerization reaction to produce an alternating copolymer. The catalyst of the present invention has the above mentioned excellent properties, because it is prepared by treating composite catalysts consisting of organometallic compounds and sulfur or active hydrogen compounds with carbon dioxide gas. Therefore, from an industrial standpoint, the present invention is very valuable, providing a catalyst having high activity for copolymerizing epoxy compounds with carbon dioxide.

The present invention will be explained by the following examples.

EXAMPLE 1

170 ml. of dioxane and 9.8 g. (0.08 mole) of diethylzinc were placed in a 500 ml. pressure reaction vessel in which air was replaced by nitrogen. 1.37 g. (molar ratio to diethylzinc: 0.95) of water were added quickly to the resulting solution in the reaction vessel under agitation. The reaction vessel was tightly stoppered and carbon dioxide gas was introduced therein to a pressure of 20 kg/cm$^2$. The reaction vessel was heated at 130°C for 3 hours under agitation. Thereafter, the reaction vessel was cooled and then opened to lower its inner pressure to normal pressure to obtain the catalyst solution.

A copolymerization reaction was performed as follows: 44 g. (1 mole) of ethylene oxide were added to the resulting catalyst solution, and the reaction vessel was tightly stoppered again. 130 g. of carbon dioxide gas were introduced into the reaction vessel under agitation, and the vessel was heated at 50°C for 24 hours under agitation. Then, the reaction vessel was opened to lower its inner pressure to normal pressure. The obtained reaction mixture was precipitated into a hydrochloric acid solution. When the precipitated product was washed with water and dried, 41 g. of water-insoluble rubber-like elastomer were obtained. On the other hand, 19.2 g. of water-soluble product were obtained from the hydrochloric acid solution and wash water by extraction with chloroform followed by evaporation to dryness.

The resulting water-insoluble product was dissolved in chloroform, and washed with dilute hydrochloric acid and then with water. Afterward the resulting chloroform solution was poured into acetone to precipitate an acetone-insoluble copolymer. As a result, 35 g. of purified white elastomer (intrinsic viscosity: 0.65 dl/g at 30°C in dioxane were obtained. This copolymer was confirmed to be substantially an alternating copolymer by the following. The resulting copolymer gave infrared absorption spectrum in which strong absorption bands characteristic of carbonate bond were observed at 1,750, 1,200, 1,300 and 785 cm$^{-1}$. In the above infrared absorption spectrum, no absorption band of polyether was observed at about 1,100 cm$^{-1}$. The elemental analytic value of the copolymer was identical to the theoretical value of the alternating copolymer consisting of ethylene oxide and carbon dioxide, as given below.

Elemental analytic value: C:40.99%, H:5.20%. Theoretical value of alternating copolymer: C:40.92%, H:4.58%.

Reference 1 (Conventional method)

170 ml. of dioxane and 9.8 g. (0.08 mole) of diethylzinc were placed in a 500 ml. pressure reaction vessel in which air was displaced by nitrogen. 1.37 g. (molar ratio to diethylzinc: 0.95) of water were added to the resulting solution in the reaction vessel. As a result, a catalyst solution was obtained.

The same copolymerization procedure as in Example 1 was repeated in the presence of the resulting catalyst solution. The resulting reaction mixture was precipitated into dilute hydrochloric acid. When the precipitated product was washed with water and dried, 29 g. of water-insoluble rubber-like elastomer were obtained. On the other hand, 15 g. of water-soluble product were obtained from the hydrochloric acid solution and wash water by extraction with chloroform followed by evaporation to dryness.

EXAMPLE 2

100 ml. of dioxane and 9.8 g. (0.08 mole) of diethylzinc were placed in a 500 ml. pressure reaction vessel in which air was displaced by nitrogen. 1.37 g. (molar ratio to diethylzinc: 0.95) of water were quickly added to the resulting solution in the reaction vessel. Then carbon dioxide gas was introduced thereinto to a pressure of 10 kg/cm$^2$. The reaction vessel was heated at 125° to 136°C for 16 hours under agitation. Thereafter the reaction vessel was cooled to 50°C. As a result, a catalyst solution was obtained.

A copolymerization reaction was conducted as follows: 97 g. (2.2 moles) of ethylene oxide were added to the resulting catalyst solution under pressure, and carbon dioxide gas was introduced thereinto to a gauge pressure of 40 kg/cm$^2$. The resulting reaction system was agitated at 50°C for 24 hours. The reaction mixture was then treated in the same manner as in Example 1. As a result, 70.3 g. of water-insoluble product (intrinsic viscosity:0.65 dl/g at 30°C in dioxane) and 19.4 g. of water-soluble product were obtained respectively.

EXAMPLES 3 to 6

64 ml. of dioxane and diethyl zinc and water (as 18% dioxane solution) were placed in a 200 ml. pressure reaction vessel in the flow of carbon dioxide gas. The reaction vessel was tightly stoppered, and carbon dioxide gas was introduced thereinto to a pressure of 20 kg/cm$^2$. Afterward the reaction vessel was heated to 130°C for a predetermined period of time under agitation. After heating was over, the reaction vessel was cooled and then opened to lower its inner pressure to normal pressure. As a result, a catalyst solution was obtained.

The copolymerization reaction was conducted as follows: 34 g. (0.76 mole) of ethylene oxide were added to the resulting catalyst solution, and 60 g. of carbon dioxide gas were introduced into the reaction vessel under pressure, and the resulting reaction system was reacted and treated as in Example 1. Table 1 shows the experimental results.

Table 1

| Example No. | Catalyst preparation conditions | | | Product (g) | |
|---|---|---|---|---|---|
| | ZnEt$_2$(g) | H$_2$O/ZnEt$_2$ molar ratio | Treatment time (hrs) | Water-insoluble product | Water-soluble product |
| 3 | 4.01 | 0.46 | 3 | 7.2 | 9.3 |
| 4 | 4.05 | 0.72 | '' | 18.7 | 10.3 |
| 5 | 3.92 | 0.81 | '' | 20.6 | 7.7 |
| 6 | 4.00 | 0.78 | 0.5 | 9.8 | 9.3 |
| 7 | 3.84 | 0.81 | 12 | 29.3 | 9.0 |
| 8 | 4.00 | 0.84 | 24 | 30.0 | 9.5 |

EXAMPLES 9 to 12

170 ml. of dioxane, 9.8 g. (0.08 mole) of diethylzinc and water were placed in a 500 ml pressure reaction vessel. The reaction vessel was tightly stoppered and carbon dioxide was introduced thereinto to a predetermined pressure. The reaction vessel was heated to a predetermined temperature for a predetermined period under agitation. After heating was over, the reaction vessel was cooled and then opened to lower its inner pressure to atmospheric pressure. As a result, a catalyst solution was obtained.

The copolymerization reaction was performed as follows: 44 g. (1.0 mole) of ethylene oxide were added to the resulting catalyst solution, and carbon dioxide gas was introduced into the reaction vessel to a predetermined pressure. The resulting reaction system was reacted at a predetermined temperature for 24 hours under agitation and treated in the same manner as in Example 1. Table 2 shows the experimental results.

Reference 2 (Conventional method)

The same reaction as in Example 13 was conducted except that diethylzinc and water were not treated under the pressure of carbon dioxide gas. The copolymerization reaction was conducted by adding ethyleneoxide and then carbon dioxide gas to the resulting catalyst solution. As a result, 1.2 g. of acetone-insoluble copolymer were obtained.

Table 2

| Example No. | Catalyst preparation conditions | | | | polymerization conditions | | Product (g) | |
|---|---|---|---|---|---|---|---|---|
| | $H_2O/ZnEt_2$ molar ratio | $CO_2$ (kg/cm²) | Temperature (°C) | Treatment time (hrs) | $CO_2$ (kg/cm²) | Temperature (°C) | Water-insoluble product | Water soluble product |
| 9 | 0.94 | 5 | 230 | 3.0 | 40 | 50 | 9.8 | 16.4 |
| 10 | '' | 60 | 200 | 3.5 | 60 | '' | 27.8 | 14.5 |
| 11 | 1.01 | 40 | 150 | 3.0 | 50 | 70 | 15.2 | 20.3 |
| 12 | 0.94 | 20 | 130 | 4.0 | 30 | Room temperature | '' | 6.3 |

EXAMPLE 13

170 ml. of dioxane and 9.8 g. (0.08 mole) od diethylzinc were placed in a 500 ml. pressure vessel in which air was displaced by argon. 1.37 g. (molar ratio to diethylzinc: 0.95) of water were added to the resulting solution in the reaction vessel. Carbon dioxide gas was introduced into the reaction vessel to a pressure of 20 kg/cm². The resulting solution was treated at room temperature for 20 hours under agitation. After the treatment was over, the reaction vessel was opened to lower its inner pressure to atmospheric pressure. As a result, a catalyst solution was obtained.

The copolymerization reaction was conducted as follows: 44 g. (1 mole) of ethylene oxide were added to the resulting catalyst solution. The reaction vessel was tightly stoppered again, and carbon dioxide gas was introduced thereinto to a gauge pressure of 23 kg/cm². The resulting reaction system was agitated at 25°C for 24 hours, and the reaction mixture was treated in the same manner as in Example 1. As a result, 13.7 g. of acetone-insoluble copolymer were obtained.

EXAMPLE 14

A catalyst solution was obtained in the same manner as in Example 13 except that the treatment time was prolonged to 67 hours. The copolymerization reaction was also conducted in the same manner as in Example 13, except that the gauge pressure was raised to 24 kg/cm² and the reaction time was shortened to 6 hours. As a result, 5.0 g. of acetone-insoluble copolymer were obtained.

EXAMPLES 15 to 17

Metal salt hydrate and a predetermined amount of solvent were placed in a 500 ml pressure reaction vessel in which air was displaced by nitrogen. Diethylzinc was poured into the resulting solution in the reaction vessel under agitation. The reaction vessel was tightly stoppered and carbon dioxide gas was introduced thereinto to a pressure of 30 kg/cm². The resulting solution was treated for 3 hours at room temperature or at a predetermined temperature. As a result, a catalyst solution was obtained.

The copolymerization reaction was conducted as follows: 88 g. (2 moles) of ethylene oxide were added to the resulting catalyst solution. The reaction vessel was tightly stoppered again, and carbon dioxide gas was introduced thereinto to a pressure of 50 kg/cm² at 50°C. The reaction mixture was agitated at 50°C for 24 hours. The resulting reaction mixture was placed in dilute hydrochloric acid to precipitate the product. When the product was thoroughly washed with water and dried, a waterinsoluble rubber-like product was obtained.

The resulting water-insoluble product was dissolved in chloroform, and the obtained chloroform solution was poured into acetone to precipitate an acetone-insoluble copolymer. When the precipitated copolymer was dried in vacuum for 24 hours, a rubberlike elastomer was obtained.

When the infrared absorption spectrum of this rubber-like elastomer was compared with that of polyethylene carbonate, it was confirmed that the rubber-like product was substantially polyethylene carbonate. Table 3 shows the experimental results.

Table 3

| Example No. | Metal salt hydrate | | Solvent | | Diethylzinc | Water of crystallization/ diethylzinc molar ratio) | Catalyst preparation temperature °C | Water-insoluble product g | Acetone-insoluble product | |
|---|---|---|---|---|---|---|---|---|---|---|
| | | | | | | | | | g | Intrinsic viscosity (at 30°C in dioxane) |
| 15 | Magnesium sulfate hepta- | 2.8 g | Dioxane | 170 ml | 10.3 g | 0.96 | 120 to 132 | 100 | 97 | 0.46 |

Table 3-continued

| Example No. | Metal salt hydrate | Solvent | Diethyl-zinc | Water of crystallization/ diethyl-zinc molar ratio | Catalyst preparation temperature °C | Water-insoluble product g | Acetone-insoluble product g | Intrinsic viscosity (at 30°C in dioxane) |
| --- | --- | --- | --- | --- | --- | --- | --- | --- |
| 16 | Zinc sulfate hepta-hydrate | 3.4 g Tetra-hydrofuran | 100 ml | 10.6 g | 1.1 | Room temperature | 28 | 18 | Not determined |
| 17 | Basic magnesium carbonate penta-hydrate | 6.5 g Dioxane | 170 ml | 10.5 g | 0.75 | 200 | 46 | 38 | 0.54 |

EXAMPLES 18 to 22

Metal salt hydrate and 170 ml. of dioxane were placed in a 500 ml. pressure reaction vessel in which air was displaced by carbon dioxide gas. A predetermined amount of diethylzinc was poured into the resulting solution in the reaction vessel under agitation. The reaction vessel was tightly stoppered, and carbon dioxide gas was introduced thereinto to a pressure of 30 kg/cm$^2$. The reaction vessel was heated at 130°C for 3 hours under agitation. After heating, the reaction vessel was cooled and then opened to lower its inner pressure to normal pressure. As a result, a catalyst solution was obtained.

The copolymerization reaction was conducted as follows: 2 moles of propylene oxide were added to the resulting catalyst solution. The reaction vessel was tightly stoppered again, and carbon dioxide gas was introduced thereinto to a pressure of 50 kg/cm$^2$ at 50°C. The resulting solution was agitated at 50°C for 24 hours. Thereafter, the reaction vessel was opened to lower its inner pressure to normal pressure. The resulting product was dissolved in chloroform, and the obtained chloroform solution was washed with dilute hydrochloric acid and then with water. The washed chloroform solution was poured into methanol to precipitate a methanol-insoluble product.

When the infrared absorption spectrum of the resulting product was compared with that of polypropylene carbonate, it was confirmed that the product was substantially polypropylene carbonate. Table 4 shows the experimental results.

which air was displaced by argon. 1.27 g. (22 m.moles) of acetone was gradually added to the resulting solution in the reaction vessel under agitation. The reaction vessel was heated at 80°C to perform reaction for one hour. Afterward carbon dioxide gas was introduced into the reaction vessel at 80°C to a pressure of 25 kg/cm$^2$, and the reaction temperature was raised to 130°C. When the resulting reaction system was reacted for 3 hours under high speed agitation, pressure in the reaction vessel rose to 35 kg/cm$^2$. After the reaction, the reaction vessel was cooled to room temperature, and opened gradually to lower its inner pressure to normal pressure. As a result, a catalyst solution was obtained.

The copolymerization reaction was conducted as follows: 45 ml. of ethylene oxide cooled to about −60°C were injected by an injector into the resulting catalyst solution, introducing carbon dioxide gas thereinto, and the reaction vessel was tightly and quickly stoppered. Carbon dioxide gas was introduced into the reaction system to a pressure of 30 kg/cm$^2$ at room temperature, and the resulting reaction system was reacted at 60°C for 24 hours. After the reaction, the reaction vessel was opened to lower its inner pressure to normal pressure. The resulting reaction mixture was placed in water to stop the reaction, and at the same time to precipitate part of the product.

The precipitated product was thoroughly washed with dilute hydrochloric acid to remove the residue of the catalyst, and the obtained product was washed again with water. 22.7 g. of water-insoluble product were obtained. The resulting water-insoluble product Table 4

| Example No. | Metal salt hydrate | | Diethylzinc | Water of crystallization/ diethylzinc (molar ratio) | Methanol-insoluble product |
| --- | --- | --- | --- | --- | --- |
| 18 | Zinc sulfate heptahydrate | 3.1 g | 10.6 g | 0.97 | 144 g |
| 19 | Aluminum sulfate 18 hydrate | 1.76 g | 6.8 g | 0.87 | 76 g |
| 20 | Ditto | 3.7 g | 7.0 g | 1.77 | 1.5 g |
| 21 | Magnesium chloride hexahydrate | 1.7 g | 6.6 g | 0.94 | 26.5 g |
| 22 | Zinc acetate dihydrate | 8.17 g | 10.5 g | 0.38 | 60.5 g |

EXAMPLE 23

85 ml. of dioxane and 2.8 g. (23 m.moles) of diethylzinc were placed in a 200 ml pressure reaction vessel in was dissolved in chloroform, and the resulting chloroform solution was poured into acetone to precipitate an acetone-insoluble copolymer. Afterward the obtained copolymer was dried in vacuum for 24 hours. As a result, 21 g. of acetone-insoluble copolymer were obtained. It was confirmed that the product was polyethylene carbonate because in its infrared absorption spectrum strong absorption bands characteristic of carbonate bond were observed at 1,750, 1,200 to 1,300 and 785 $cm^{-1}$, and no absorption band characteristic of polyether was observed at 1,100 $cm^{-1}$.

On the other hand, 7.3 g. of water-soluble product were obtained from the aqueous solution by chloroform extraction. It was confirmed by its infrared absorption spectrum that the above water-soluble product was a mixture of polyether carbonate containing an ether unit and cyclic ethylene carbonate.

Reference 3

85 ml. of dioxane and 5.3 g. (43 m.moles) of diethylzinc were placed in a 200 ml. pressure reaction vessel in which air was displaced by argon. 2.1 g. (36 m.moles) of acetone were gradually poured into the resulting solution in the reaction vessel under agitation. The reaction vessel was heated at 80°C to perform reaction for 1 hour. Afterward the reaction temperature was raised to 130°C without adding carbon dioxide gas to age the catalyst system for 3 hours. The reaction vessel was cooled to room temperature.

The copolymerization reaction was performed as follows: 45 ml. of satisfactorily cooled ethylene oxide were injected by an injector into the resulting catalyst solution under a stream of argon gas, and the procedure of Example 23 was repeated. As a result, 2.0 g. of water-insoluble product and 5.0 g. of water-soluble product were obtained respectively.

EXAMPLES 24 to 36

The procedure of Example 23 was repeated except that various kinds of active hydrogen compounds, as well as sulfur, were used as the co-catalyst components instead of acetone, and various kinds of solvents were used instead of dioxane. Excluding Examples 30 and 34 in which 88 g. of ethylene oxide were used, 40 g. of ethylene oxide were used. Excluding Example 34 in which the pressure of carbon dioxide gas was 40 $kg/cm^2$, the pressure of carbon dioxide gas was 40 to 60 $kg/cm^2$. In Examples 29, 30, 33 and 34, the reaction temperature was 50°C. In Example 34, the reaction time was 21.5 hours.

Table 5 shows the experimental results. In Table 5, molar ratio is the molar ratio of active hydrogen compounds to organometallic compounds, catalyst treatment condition I means that the catalyst consisting of organometallic compounds and compounds having active hydrogen was aged in the absence of carbon dioxide gas, and catalyst treatment condition II means that the above catalyst was treated in the presence of carbon dioxide gas. The water-soluble product of Example 34 was a chloroform-insoluble product, and most of the product was the isophthalic acid used as the catalyst.

Table 5

| Example No. | Solvent | | Catalyst | $ZnEt_2$ (millimole) | Molar Ratio | Catalyst maturation conditions | | Water-insoluble product (g) | Water-soluble product (g) |
| --- | --- | --- | --- | --- | --- | --- | --- | --- | --- |
| | | | | | | I | II | | |
| 24 | Dioxane | 80 ml | Nitromethane | 0.67g | 23 | 0.5 | 100°C, 1 hour | 130°C 3 hours | 25 | 7.9 |
| 25 | n-hexane | '' | '' | 0.64 | '' | '' | '' | '' | 11.2 | 5.9 |
| 26 | Dioxane | '' | '' | 0.84 | '' | '' | '' | '' | 6.8 | 3.6 |
| 27 | '' | '' | Acetaldehyde | 1.90 | '' | 2 | 80°C 1 hour | '' | 25.6 | 4.8 |
| 28 | Benzene | '' | Piperazine | 2.10 | '' | 1 | '' | '' | 6.4 | 3.0 |
| 29 | Diethyl ether | '' | Resorcin | 3.15 | 41 | 0.7 | Room temperature 1 hour | '' | 59 | 14.0 |
| 30 | Dioxane | 170 ml | Butane diol-1,4 | 3.42 | 45 | 0.83 | '' | '' | 0.5 | — |
| 31 | '' | 80 ml | Acetaldehyde | 2.93 | 23 | 1.9 | 80°C 1 hour | 120°C 7.5 hours | 22.9 | 5.0 |
| 32 | '' | '' | Acetyl acetone | 3.39 | 42 | 0.81 | — | 130°C 3 hours | 1.86 | 4.3 |
| 33 | Dioxane | 155 ml | Oxalic acid | 4.50 | 83 | 0.60 | Room temperature, 1 hour | 100°C 2 hours | 2.0 | — |
| 34 | '' | 111 ml | Isophthalic acid | 8.24 | 55 | 0.90 | — | 130°C, 3 hours | 20.0 | 8.0 |
| 35 | '' | 80 ml | Hydrogen sulfide | — | '' | 0.10 | — | '' | 3.6 | 2.1 |
| 36 | '' | '' | Sulfur | 6.16 | '' | 3.5 | Room temperature, 1 hour | '' | 5.7 | 7.2 |

References 4, 5

Ethylene oxide was copolymerized with carbon dioxide by the same manner as in Reference 1, using various kinds of active hydrogen compounds instead of acetone. Table 6 shows the experimental results.

Table 6

| Reference No. | Cocatalyst | Solvent | $ZnEt_2$ (millimole) | Molar ratio | Water-insoluble product | Water-soluble product |
| --- | --- | --- | --- | --- | --- | --- |
| 4 | Nitro- | Dioxane | 23 | 0.50 | 5.1 g | 1.8 g |

Table 6-continued

| Reference No. | Cocatalyst | Solvent | ZnEt$_2$ (milli mole) | Molar ratio | Water-insoluble product | Water-soluble product |
|---|---|---|---|---|---|---|
| 5 | methane 0.7 g Piperazine 2.3 g | Benzene | " | 0.91 | Trace | 9.0 g |

EXAMPLE 37

85 ml. of diethylether and 2.8 g. (27 m.moles) of diethylzinc were placed in a 200 ml. pressure reaction vessel in which air was displaced by argon. 0.33 g. (5.4 m.moles) of nitromethane and 0.6 g. (11 m.moles) of acetone were successively and gradually poured into the resulting solution. The catalyst solution was obtained by the same procedure as in Example 23.

The copolymerization reaction was performed as follows: 67 ml. of propylene oxide were added into the resulting catalyst solution under a carbon dioxide atmosphere. The vessel was then stoppered, and the carbon dioxide was introduced thereinto to a pressure of 30 kg/cm$^2$ and stirred at 60°C for 24 hours. The resulting reaction product was precipitated in methanol containing concentrated hydrochloric acid, rinsed with additional methanol and dried. The dried product was dissolved in chloroform, and the resulting chloroform solution was shaken well together with dilute hydrochloric acid to remove the residue of the catalyst. Afterward, the obtained solution was washed again with water, and the resulting solution was poured into a large amount of methanol. As a result, 15.2 g. of methanol-insoluble product were obtained. It was confirmed that the above product was polypropylene carbonate by its infrared absorption spectrum. On the other hand, 3.5 g. of methanol-soluble product was recovered from methanol. It was confirmed by its infrared absorption spectrum that the product was a mixture of polypropylene ether carbonate containing an ether unit and cyclic propylene carbonate.

EXAMPLES 38 to 41

Various kinds of epoxy compounds instead of propylene oxide were copolymerized with carbon dioxide in the same manner as in Example 24. Table 7 shows the experimental results. In these examples, 80 ml. of solvent were used.

Table 7

| Example No. | Epoxy compounds Chemical name | g | Cocatalyst (%) Acetone | Acetaldehyde | ZnEt$_2$ (milli-mole) | Molar ratio | Catalyst maturation conditions I | II | Solvent | Methanol-insoluble product (g) |
|---|---|---|---|---|---|---|---|---|---|---|
| 38 | Epichlorohydrin | 40 | 1.27 | — | 23 | 0.95 | 100°C, 0.5 hour | 150°C, 5 hours | Dioxane | 0.8 |
| 39 | Cyclohexane oxide | 50 | " | — | " | " | 80°C, 1 hour | 130°C, 3 hours | Benzene | 21.0 |
| 40 | Ethylene oxide | 40 | 0.97 | 0.68 | " | 1.5 | " | " | Dioxane | 18.4 |
| 41 | Glycidyl methacrylate | 19 | — | 1.10 | 12.5 | 2.0 | 85°C, 15 hours | " | Ethylene dichloride | 1.0 |

EXAMPLES 42 to 49

Solvent, diethylzinc, and water were placed in a 200 ml. pressure reaction vessel under a stream of carbon dioxide gas. A predetermined amount of carbon dioxide gas was introduced thereinto. The reaction vessel was heated at 135° to 140°C for 5 hours under agitation, and cooled. As a result, a catalyst solution was obtained.

The copolymerization reaction was conducted as follows: A predetermined amount of various kinds of epoxy compounds were added to the resulting catalyst solution, a predetermined amount of carbon dioxide gas was introduced into the reaction vessel under pressure, and the resulting reaction system was copolymerized at 50°C for 24 hours under agitation. The resulting reaction mixture was dissolved in chloroform, and the resulting chloroform solution was washed with dilute hydrochloric acid and then with water. Afterward, the washed solution was poured into methanol to precipitate the product. In the infrared absorption spectrum of the product, absorption bands were observed at 1,750, 1200 to 1,300 and 785 cm$^{-1}$. Therefore, it was confirmed that various kinds of epoxy compounds copolymerized with carbon dioxide. Table 8 shows the experimental results.

Table 8

| Example No. | Catalyst preparation conditions Solvent Chemical name | ml | ZnEt$_2$ (mole) | H$_2$O/ ZnEt$_2$ (molar ratio) | CO$_2$ (g) | Polymerization conditions Epoxy compounds Chemical name | g | Mole | CO$_2$ (g) | Methanol-insoluble product (g) |
|---|---|---|---|---|---|---|---|---|---|---|
| 42 | Benzene | 100 | 0.08 | 0.95 | 20 | Ethylene oxide | 88 | 2 | 170 | 40 |
| 43 | Diethyl | | | | | | | | | |

Table 8-continued

| Example No. | Solvent Chemical name | ml | ZnEt$_2$ (mole) | H$_2$O/ZnEt$_2$ (molar ratio) | CO$_2$ (g) | Epoxy compounds Chemical name | g | Mole | CO$_2$ (g) | Methanol-insoluble product (g) |
|---|---|---|---|---|---|---|---|---|---|---|
|  | ether | " | " | 0.94 | 10 | " | " | " | 130 | 21 |
| 44 | Benzene | 80 | " | " | 15 | Styrene oxide | 120 | 1 | " | 25 |
| 45 | Dioxane | " | 0.07 | 0.96 | " | Isopropylene oxide | 36 | 0.5 | 120 | 4.1 |
| 46 | n-hexane | " | " | " | 20 | Propylene oxide | 116 | 2 | 130 | 13 |
| 47 | Dioxane | 85 | 0.08 | 0.95 | " | Epichlorohydrin | 185 | 2 | 120 | 7.2 |
| 48 | " | 100 | 0.04 | " | " | Cyclohexene | 49 | 0.5 | 100 | 23 |
| 49 | Ethylene dichloride | " | 0.08 | 0.925 | " | Propylene oxide | 58 | 1 | " | 28 |

EXAMPLE 50

100 ml. of dioxane and 2.94 g. (25.8 m.moles) of triethylaluminum were placed in a 500 ml. pressure reaction vessel in which air was displaced by argon. 35 ml. of dioxane containing 3.0 g. (34.9 m.moles) of piperazine were poured into the resulting solution in the reaction vessel. The resulting solution was treated in the same manner as in Example 23. As a result, a catalyst solution was obtained.

The copolymerization reaction was performed as follows: 30 ml. of propylene oxide were poured into the resulting catalyst solution under a carbon dioxide atmosphere, and the resulting solution was reacted at 50°C for 36 hours. Afterward, the obtained product was treated in the same manner as in Example 23. As a result, 1.0 g. of water-insoluble product was obtained. The product was confirmed to have a cerbonate unit by infrared spectrum.

Reference 6

A catalyst system consisting of triethylaluminum and piperazine was aged in the same manner as in Example 50 in the absence of carbon dioxide gas at 80°C for 18 hours. Copolymerization was conducted at 50°C for 17 hours, but a water-insoluble copolymer was not obtained at all.

EXAMPLE 51

80 ml. of dioxane and 1.37 g. (0.012 mole) of triethylaluminum were placed in a 200 ml. pressure reaction vessel in which air was displaced by nitrogen. 0.14 g. (molar ratio to triethylaluminum:0.65) of water was added to the resulting solution, and carbon dioxide was introduced thereinto to a pressure of 10 kg/cm$^2$. The reaction vessel was heated at 130°C for 2 hours under agitation. After heating, the reaction vessel was cooled and opened to lower its inner pressure to atmospheric pressure. As a result, a catalyst solution was obtained.

The copolymerization reaction was conducted as follows: 10.0 g. (0.72 mole) of propylene oxide were added to the resulting catalyst solution. Carbon dioxide was introduced into the reaction vessel to a pressure of 20 kg/cm$^2$. The resulting product was agitated at 50°C for 10 hours. The resulting reaction mixture was dissolved in benzene, and the resulting benzene solution was washed with dilute hydrochloric acid and then with water. When the washed solution was evaporated to dryness, 6.0 g. of product were obtained. In the infrared absorption spectrum, an absorption band characteristic of carbonate bond at 1,750 cm$^{-1}$ was observed. Therefore, it was confirmed that the product was a copolymer of propylene oxide and carbon dioxide.

EXAMPLE 52

A diethyl ether solution containing 6 m.moles of diethylmagnesium and 0.52 g. (6 m.moles) of anhydrous piperazine were aged in 70 ml. of tetrahydrofuran at room temperature for 30 minutes under a nitrogen atmosphere. Afterward the resulting catalyst solution was transferred to a 200 ml. pressure reaction vessel. The catalyst solution was aged at 70°C for 1 hour, and then carbon dioxide gas was introduced into the reaction vessel to a pressure of 25 kg/cm$^2$ at 70°C. Thereafter, the vessel was heated to 120°C for 3 hours. As a result, a catalyst solution was obtained.

The copolymerization reaction was conducted as follows: 40 ml. of propylene oxide were injected by an injector into the resulting catalyst solution in the flow of carbon dioxide gas. Carbon dioxide gas was introduced into the reaction vessel at room temperature to a pressure of 30 kg/cm$^2$, and the resulting reaction system was copolymerized at 50°C for 40 hours. Afterward the resulting reaction mixture was poured in methanol containing concentrated hydrochloric acid to stop the copolymerization reaction. Precipitated product was dissolved in benzene, and the resulting benzene solution was well washed with dilute hydrochloric acid to remove the residue of catalyst and then subjected to freeze-drying. As a result, 1.43 g. of solid was obtained. It was confirmed by its infrared absorption spectrum that the solid contained a carbonate unit.

EXAMPLE 53

80 ml. of dioxane, 4.78 g. (39 m.moles) of diethylzinc, 0.54 g. (molar ratio to diethylzinc:0.78) of water and 0.19 g. (molar ratio to diethylzinc:0.12) of methanol were placed in a 200 ml. pressure reaction vessel in which air was displaced by argon. Carbon dioxide gas was introduced into the reaction vessel to a pressure of 5.0 kg/cm$^2$ at room temperature, and the vessel was heated at 130°C for 3 hours under agitation. As a result, a catalyst solution was obtained.

The copolymerization reaction was conducted as follows: 50 ml. of ethylene oxide were added to the resulting catalyst solution. Carbon dioxide gas was introduced into the reaction vessel to a pressure of 30 kg/cm$^2$ at room temperature, and the copolymerization reaction was performed at 50°C for 20 hours. When the resulting copolymer was treated in the same manner as in Example 23, 25.6 g. of water-insoluble product and 12.8 g. of water-soluble product were obtained respectively.

What is claimed is:

1. A process for producing a copolymer of an epoxy compound with carbon dioxide, comprising copolymerizing an epoxy compound with carbon dioxide in the presence of a catalyst composition comprising the reaction product of (a) an organo-metallic compound having the general formula R'nM, wherein $n$ is 2 or 3, at least one R' is selected from the group consisting of an alkyl group, an alicyclic group and halogen, hydroxy and alkoxy derivatives thereof, and hydrogen, the remaining R' groups are selected from the group consisting of alkyl groups, alicyclic groups, alkaryl groups, aralkyl groups, aryl groups and halogen, hydroxy and alkoxy derivatives thereof, and M is a metal element selected from the group consisting of those metal elements in Groups II and III of the Periodic Table, (b) at least one co-catalyst component selected from the group consisting of sulfur and compounds containing one or more active hydrogen atoms in a molar ratio to the organo-metallic compound within the range of from about 0.1 to about 5.0, and (c) carbon dioxide gas under a pressure at room temperature of from about 5 to about 50 kg/cm$^2$ and in a molar ratio to the organo-metallic compound of at least 1, said reaction product having been obtained by reacting together said reactants at a temperature between room temperature and about 300°C for a time of from about 0.1 to about 100 hours, the copolymerization being carried out at a temperature within the range of from about 0°C to about 150°C.

2. The process of claim 1 wherein the copolymerization is carried out at a temperature of between room temperature and about 70°C.

3. The process of claim 1 wherein the organometallic compound is present in an amount within the range of from about 0.001 to about 20 mole percent based upon the epoxy compound.

4. The process of claim 3 wherein the organometallic compound is present in an amount within the range of from about 0.01 to about 10 mole percent based upon the epoxy compound.

5. The process of claim 1 wherein the molar ratio of the co-catalyst component to the organometallic compound is within the range of from about 0.3 to about 2.0.

6. The process of claim 1 wherein M is a metal element selected from the group consisting of zinc, magnesium and aluminum.

7. The process of claim 1 wherein said organo-metallic compound is selected from the group consisting of dialkylzinc, dialkylmagnesium and trialkylaluminum.

* * * * *